US012593066B2

(12) United States Patent
Misra et al.

(10) Patent No.: US 12,593,066 B2
(45) Date of Patent: Mar. 31, 2026

(54) IMAGE DECODING APPARATUS AND IMAGE CODING APPARATUS

(71) Applicant: Sharp Kabushiki Kaisha, Sakai City (JP)

(72) Inventors: Kiran Mukesh Misra, Vancouver, WA (US); Jie Zhao, Vancouver, WA (US); Christopher Andrew Segall, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 2 days.

(21) Appl. No.: 18/960,114

(22) Filed: Nov. 26, 2024

(65) Prior Publication Data

US 2025/0088663 A1 Mar. 13, 2025

Related U.S. Application Data

(63) Continuation of application No. 17/865,437, filed on Jul. 15, 2022, now Pat. No. 12,192,515, which is a continuation of application No. 16/989,977, filed on Aug. 11, 2020, now Pat. No. 11,438,626, which is a continuation of application No. 16/480,336, filed as application No. PCT/JP2017/045945 on Dec. 21, 2017, now Pat. No. 10,791,338.

(60) Provisional application No. 62/452,879, filed on Jan. 31, 2017.

(51) Int. Cl.
| | |
|---|---|
| *H04N 19/593* | (2014.01) |
| *H04N 19/119* | (2014.01) |
| *H04N 19/126* | (2014.01) |
| *H04N 19/176* | (2014.01) |

(52) U.S. Cl.
CPC ......... *H04N 19/593* (2014.11); *H04N 19/119* (2014.11); *H04N 19/126* (2014.11); *H04N 19/176* (2014.11)

(58) Field of Classification Search
CPC .... H04N 19/11; H04N 19/119; H04N 19/126; H04N 19/176; H04N 19/186; H04N 19/593; H04N 19/70
See application file for complete search history.

(56) References Cited

PUBLICATIONS

Misra et al., "Image Decoding Apparatus and Image Coding Apparatus", U.S. Appl. No. 17/865,437, filed Jul. 15, 2022.

*Primary Examiner* — Anner Holder
(74) *Attorney, Agent, or Firm* — Keating & Bennett, LLP

(57) ABSTRACT

A method of generating a prediction for an area of video data, comprises Receiving a rectangular video block including sample values, and for each sample included in the video block, generating a predictive sample value by averaging a horizontal interpolation and a vertical interpolation corresponding to the location of the sample within the video block.

6 Claims, 17 Drawing Sheets

4:2:0 Sampling Format
Luma Samples
Pairs of Chroma  Samples

CU

Current Block

| 107 | 103 | 101 | 98 |
| 111 | 108 | 104 | 100 |
| 118 | 113 | 108 | 101 |
| 119 | 109 | 109 | 104 |

Prediction

| 99 | 93 | 90 | 92 |
| 101 | 93 | 92 | 92 |
| 97 | 94 | 90 | 88 |
| 109 | 98 | 100 | 91 |

Subtraction

Residual

| 8 | 10 | 11 | 6 |
| 10 | 15 | 12 | 8 |
| 11 | 19 | 18 | 13 |
| 10 | 11 | 9 | 13 |

Transformation

Transform Coefficients

| 184 | -11 | -6 | -11 |
| -26 | -5 | 6 | 13 |
| 8 | -9 | 6 | -9 |
| -26 | 13 | 6 | -5 |

Scaling Factors

| 5 | 5 | 6 | 6 |
| 5 | 5 | 6 | 6 |
| 6 | 6 | 7 | 7 |
| 6 | 6 | 7 | 7 |

Quantization

Coefficient Level Values

| 37 | -2 | -1 | -2 |
| -5 | -1 | 1 | 2 |
| 1 | -2 | 1 | -1 |
| -4 | 2 | 1 | -1 |

To Bitstream

From Bitstream

Coefficient Level Values

| 37 | -2 | -1 | -2 |
|----|----|----|----|
| -5 | -1 | 1 | 2 |
| 1 | -2 | 1 | -1 |
| -4 | 2 | 1 | -1 |

Scaling Factors

| 5 | 5 | 6 | 6 |
|---|---|---|---|
| 5 | 5 | 6 | 6 |
| 6 | 6 | 7 | 7 |
| 6 | 6 | 7 | 7 |

Inverse Quantization

Transform Coefficients

| 185 | -10 | -6 | -12 |
|-----|-----|----|-----|
| -25 | -5 | 6 | 12 |
| 6 | -12 | 7 | -7 |
| -24 | 12 | 7 | -7 |

Inverse Transformation

Residual

| 8 | 8 | 12 | 8 |
|----|----|----|----|
| 10 | 14 | 11 | 10 |
| 11 | 16 | 18 | 16 |
| 10 | 10 | 11 | 14 |

Prediction

| 99 | 93 | 90 | 92 |
|-----|----|-----|----|
| 101 | 93 | 92 | 92 |
| 97 | 94 | 90 | 88 |
| 109 | 98 | 100 | 91 |

Addition

Reconstruced Block

| 107 | 101 | 102 | 100 |
|-----|-----|-----|-----|
| 111 | 107 | 103 | 102 |
| 108 | 110 | 108 | 104 |
| 119 | 108 | 111 | 105 |

CTB

IMAGE DECODING APPARATUS AND IMAGE CODING APPARATUS

CROSS REFERENCE

This Nonprovisional application claims priority under 35 U.S.C. § 119 on provisional Application No. 62/452,879 on Jan. 31, 2017, the entire contents of which are hereby incorporated by reference.

TECHNICAL FIELD

This disclosure relates to video coding and more particularly to techniques for partitioning a picture of video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265 April 2015, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 3 (JEM 3), Algorithm Description of Joint Exploration Test Model 3 (JEM 3), ISO/IEC JTC1/SC29/WG11 Document: JVET-C1001v3, May 2016, Geneva, CH, which is incorporated by reference herein, describes the coding features that are under coordinated test model study by the JVET as potentially enhancing video coding technology beyond the capabilities of ITU-T H.265. It should be noted that the coding features of JEM 3 are implemented in JEM reference software maintained by the Fraunhofer research organization. Currently, the updated JEM reference software version 3 (JEM 3.0) is available. As used herein, the term JEM is used to collectively refer to algorithms included in JEM 3 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

A method of generating a prediction for an area of video data, comprises receiving a rectangular video block including sample values, and for each sample included in the video block, generating a predictive sample value by averaging a horizontal interpolation and a vertical interpolation corresponding to the location of the sample within the video block.

BRIEF DESCRIPTION OF DRAWINGS

FIG. 6B is conceptual diagram illustrating example of coding a block of video data in accordance with one or more techniques of this disclosure.

FIG. 9 is a conceptual diagram illustrating video component quad tree binary tree partitioning in accordance with one or more techniques of this disclosure.

DESCRIPTION OF EMBODIMENTS

Figure 1:
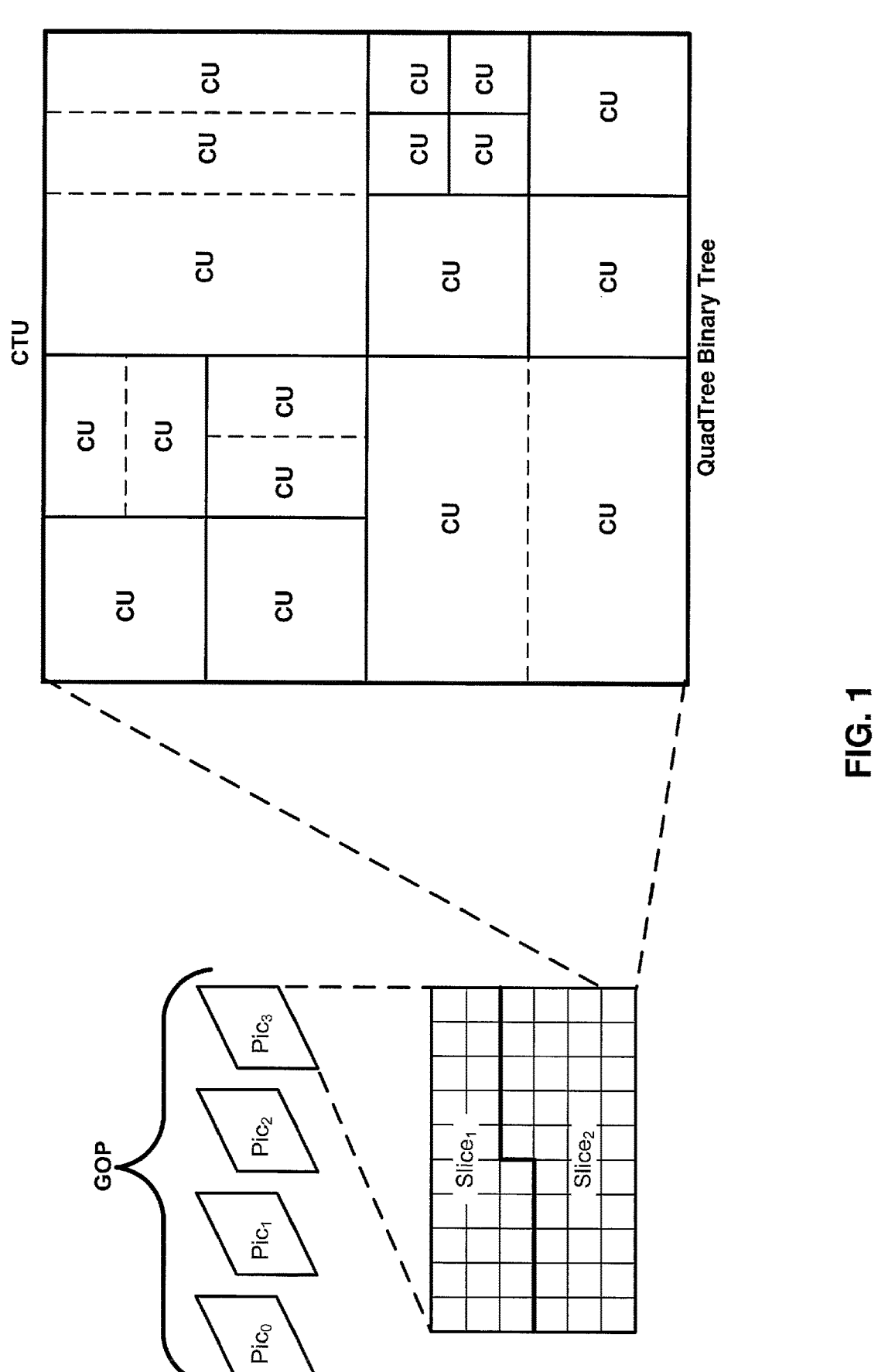
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for partitioning a picture of video data. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for generating a prediction for an area of video data comprises one or more processors configured to receive a rectangular video block including sample values, and for each sample included in the video block, generate a predictive sample value by averaging a horizontal interpolation and a vertical interpolation corresponding to the location of the sample within the video block.

In one example, a non-transitory computer-readable storage medium comprises instructions stored thereon that, when executed, cause one or more processors of a device to receive a rectangular video block including sample values, and for each sample included in the video block, generate a predictive sample value by averaging a horizontal interpolation and a vertical interpolation corresponding to the location of the sample within the video block.

In one example, an apparatus comprises means for receiving a rectangular video block including sample values, and means for generating a predictive sample value by averaging a horizontal interpolation and a vertical interpolation corresponding to the location of the sample within the video block for each sample included in the video block.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixels values may be described as including sample values for respective components of video data, which may also be referred to as color components, (e.g., luma (Y) and chroma (Cb and Cr) components or red, green, and blue components). It should be noted that in some cases, the terms pixel values and sample values are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure. In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBS are supported for intra prediction, where a CB may form the PB or the CB may be split into four square PBs (i.e., intra prediction PB sizes type include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

Figure 2:
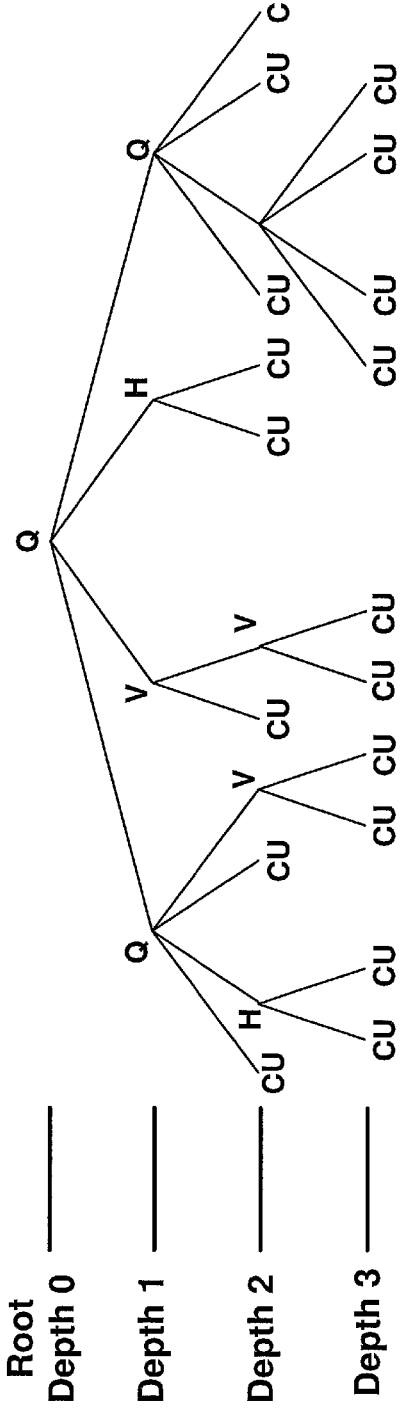
FIG. 2 is a conceptual diagram illustrating an example of a quad tree binary tree in accordance with one or more techniques of this disclosure.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice. FIG. 2 is a conceptual diagram illustrating an example of a QTBT corresponding to the example QTBT partition illustrated in FIG. 1.

In JEM, a QTBT is signaled by signaling QT split flag and BT split mode syntax elements. When a QT split flag has a value of 1, a QT split is indicated. When a QT split flag has a value of 0, a BT split mode syntax element is signaled. When a BT split mode syntax element has a value of 0, no binary splitting is indicated. When a BT split mode syntax element has a value of 1, a vertical split mode is indicated. When a BT split mode syntax element has a value of 2, a horizontal split mode is indicated. Further, BT splitting may be performed until a maximum BT depth is reached. Thus, according to JEM, the QTBT illustrated in FIG. 2 may be signaled based on the pseudo-syntax provided in Table 1:

TABLE 1

```
QTflag = 1; //Depth 0 syntax
    QT flag = 1; //Depth 1 syntax
        QT flag = 0, BT split = 0; //Depth 2 syntax
        QT flag = 0, BT split = 2; /Depth 2 syntax
            BT split = 0; //Depth 3 syntax
            BT split = 0; //Depth 3 syntax
        QT flag = 0, BT split = 0; //Depth 2 syntax
        QT flag = 0, BT split = 1; //Depth 2 syntax
            BT split = 0; //Depth 3 syntax
            BT split = 0; //Depth 3 syntax
    QT flag = 0; BT split = 1; //Depth 1 syntax
        BT split = 0; //Depth 2 syntax
        BT split = 1; //Depth 2 syntax
            BT split = 0; //Depth 3 syntax
            BT split = 0; //Depth 3 syntax
    QT flag = 0; BT split = 2; //Depth 1 syntax
        BT split = 0; //Depth 2 syntax
        BT split = 0; //Depth 2 syntax
    QT flag = 1; //Depth 1 syntax
        QT flag = 0, BT split = 0; //Depth 2 syntax
        QT flag = 1; //Depth 2 syntax
            QT flag = 0, BT split = 0; //Depth 3 syntax
            QT flag = 0, BT split = 0; //Depth 3 syntax
            QT flag = 0, BT split = 0; //Depth 3 syntax
            QT flag = 0, BT split = 0; //Depth 3 syntax
        QT flag = 0, BT split = 0; //Depth 2 syntax
        QT flag = 0, BT split = 0, //Depth 2 syntax
```

In one example, when a maximum QT depth is reached the signaling of QT flag may be skipped and its value may be inferred, e.g., as 0. In one example, when a current depth is smaller than a minimum QT depth then the signaling of a QT flag may be skipped and its value may be inferred, e.g., as 1. In one example, when a maximum depth is reached for the signaling of a partition type, then the associated syntax element may not be signaled in the bitstream and its value may be inferred. In one example, when a minimum depth for the signaling of a partition type is not yet reached, then the associated syntax element may not be signaled in the bit-stream and its value may be inferred. In one example, when no QT split is allowed and when current depth is smaller than minimum BT depth then signaling of BT split may be modified to not allow BT split to equal 0.

In one example, following tree traversal may be used to signal the split decisions. For example:

1. Signal split decisions for current node
2. For i=1 to the number of children of the current node (in steps of 1) do the following:
   a. Determine child node n corresponding to i (this may be based on a lookup, that is based on a split mode of the current node)
   b. Traverse the subtree rooted at child node n calling the traversal function recursively.

In one example, following tree traversal may be used to signal the split decisions. For example: 1. For i=1 to number of children of current node (in steps of 1) do the following:
   a. Determine child node n corresponding to i (this may be based on a lookup, that is based on a split mode of the current node)
   b. Traverse the subtree rooted at child node n calling the traversal function recursively
   c. Signal split decisions for current node.

In an example, following tree traversal may be used to signal the split decisions. For example:

1. For i=1 to number of children of current node (in steps of 1) do the following:
   a. Determine child node n corresponding to i (this may be based on a lookup, that is based on a split mode of the current node)
   b. Traverse the subtree rooted at child node n calling the traversal function recursively
2. Signal split decisions for current node.

In one example, trees may be traversed in increasing depth. In such a case, all split decisions for nodes at a particular depth may be signaled before proceeding to the next depth.

Figure 3:
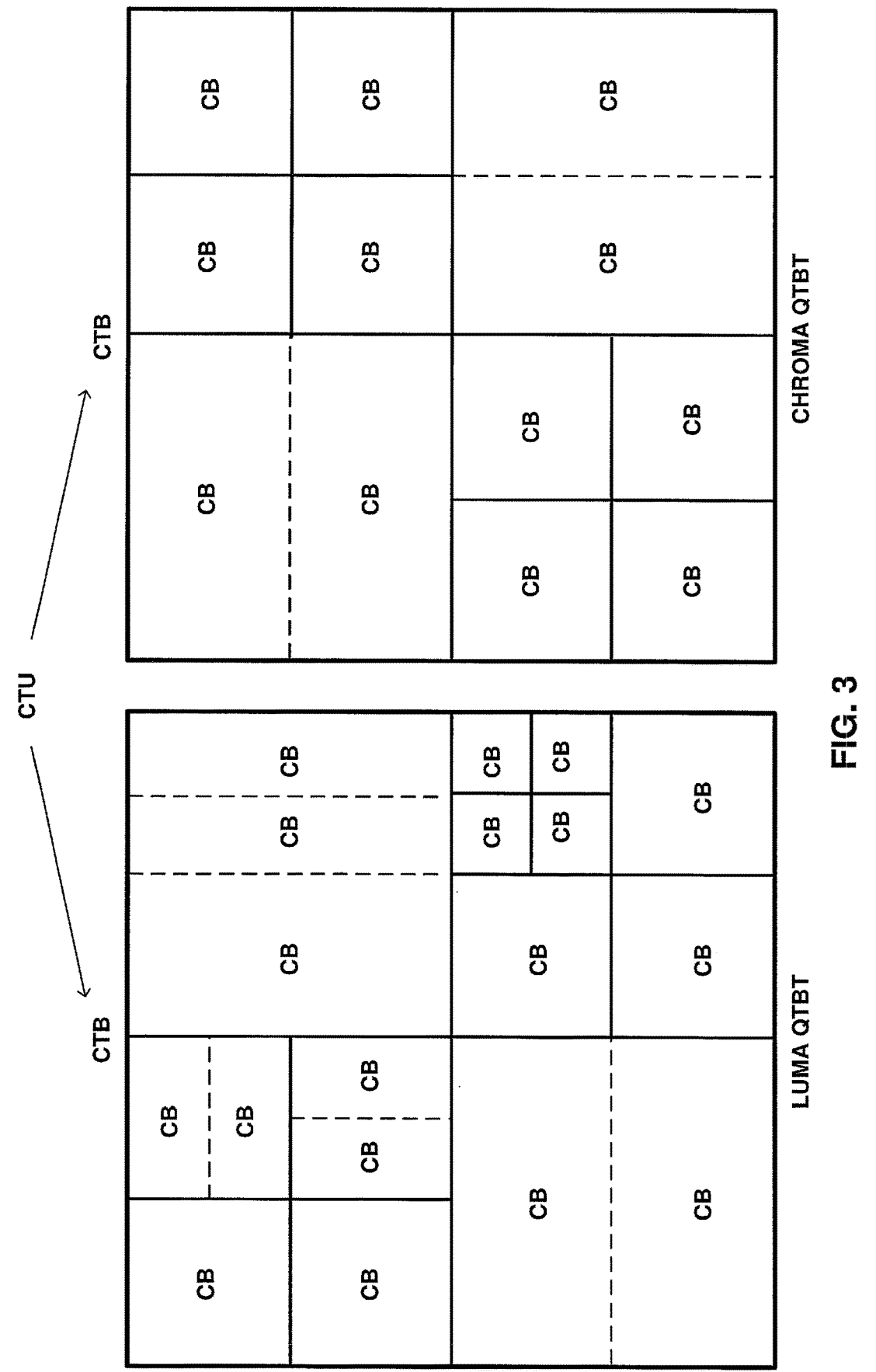
FIG. 3 is a conceptual diagram illustrating video component quad tree binary tree partitioning in accordance with one or more techniques of this disclosure.

As illustrated in FIG. 2 and Table 1, QT split flag syntax elements and BT split mode syntax elements are associated with a depth, where a depth of zero corresponds to a root of a QTBT and higher value depths correspond to subsequent depths beyond the root. Further, in JEM, luma and chroma components may have separate QTBT partitions. That is, in JEM luma and chroma components may be partitioned independently by signaling respective QTBTs. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component are not required to and do not neces-sarily align with CBs of chroma components. Currently, in JEM independent QTBT structures are enabled for slices using intra prediction techniques. It should be noted that in some cases, values of chroma variables may need to be derived from the associated luma variable values. In these cases, the sample position in chroma and chroma format may be used to determine the corresponding sample position in luma to determine the associated luma variable value.

Additionally, it should be noted that JEM includes the following parameters for signaling of a QTBT tree:

CTU size: the root node size of a quadtree (e.g., 256×256, 128×128, 64×64, 32×32, 16×16 luma samples);

MinQTSize: the minimum allowed quadtree leaf node size (e.g., 16×16, 8×8 luma samples);

MaxBTSize: the maximum allowed binary tree root node size, i.e., the maximum size of a leaf quadtree node that may be partitioned by binary splitting (e.g., 64×64 luma samples);

MaxBTDepth: the maximum allowed binary tree depth, i.e., the lowest level at which binary splitting may occur, where the quadtree leaf node is the root (e.g., 3);

MinBTSize: the minimum allowed binary tree leaf node size; i.e., the minimum width or height of a binary leaf node (e.g., 4 luma samples).

It should be noted that in some examples, MinQTSize, MaxBTSize, MaxBTDepth, and/or MinBTSize may be different for the different components of video.

In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 4:
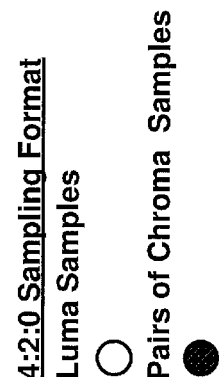
FIG. 4 is a conceptual diagram illustrating an example of a video component sampling format in accordance with one or more techniques of this disclosure.
Figure 4:
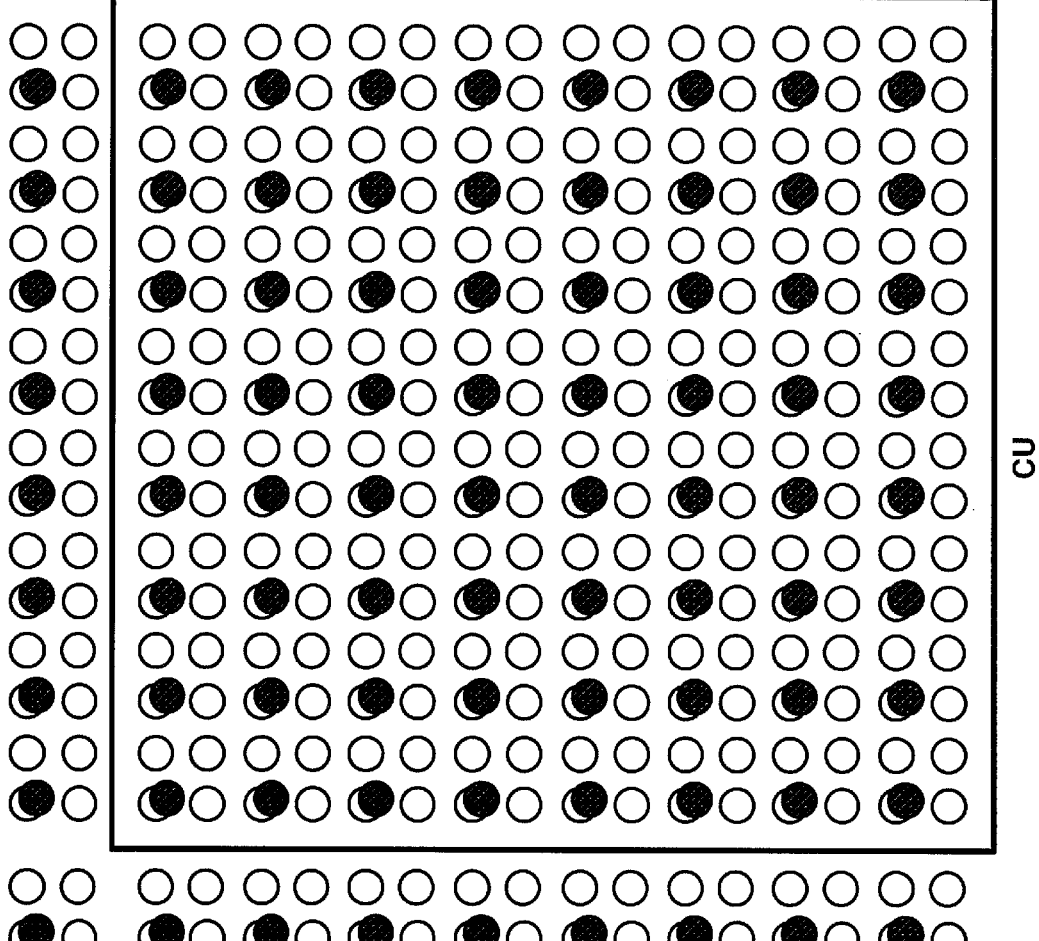

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 5:
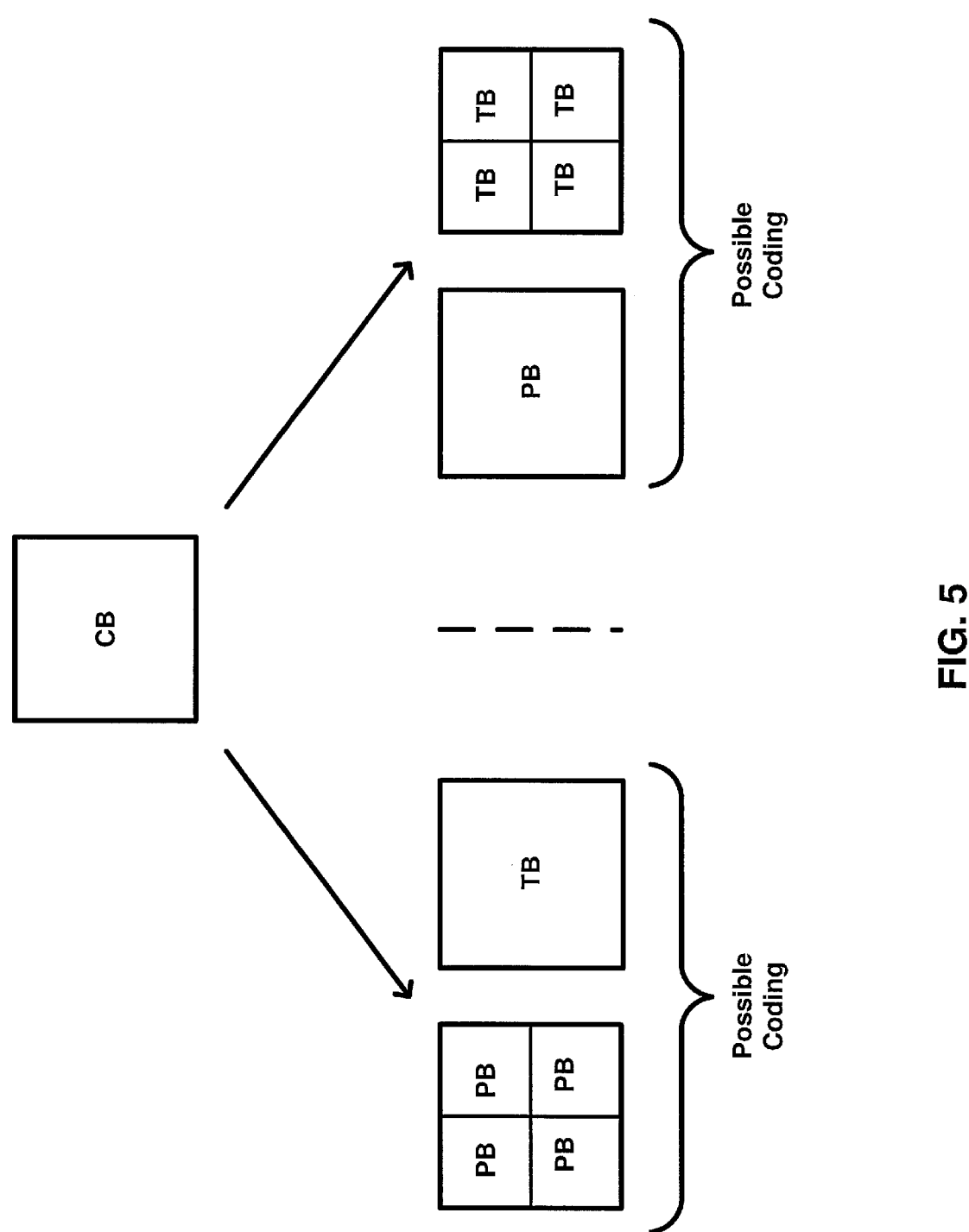
FIG. 5 is a conceptual diagram illustrating possible coding structures for a block of video data according to one or more techniques of this disclosure.

As described above, intra prediction data or inter prediction data is used to produce reference sample values for a block of sample values. The difference between sample values included in a current PB, or another type of picture area structure, and associated reference samples (e. g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 5 illustrates examples of alternative PB and TB combinations that may be used for coding a particular CB. Further, it should be noted that in ITU-T H.265, TBs may have the following sizes 4×4, 8×8, 16×16, and 32×32.

It should be noted that in JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization scales transform coefficients in order to vary the amount of data required to represent a of transform group coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in the examples below quantization processes are to arithmetic operations described with respect associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Figure 6A:
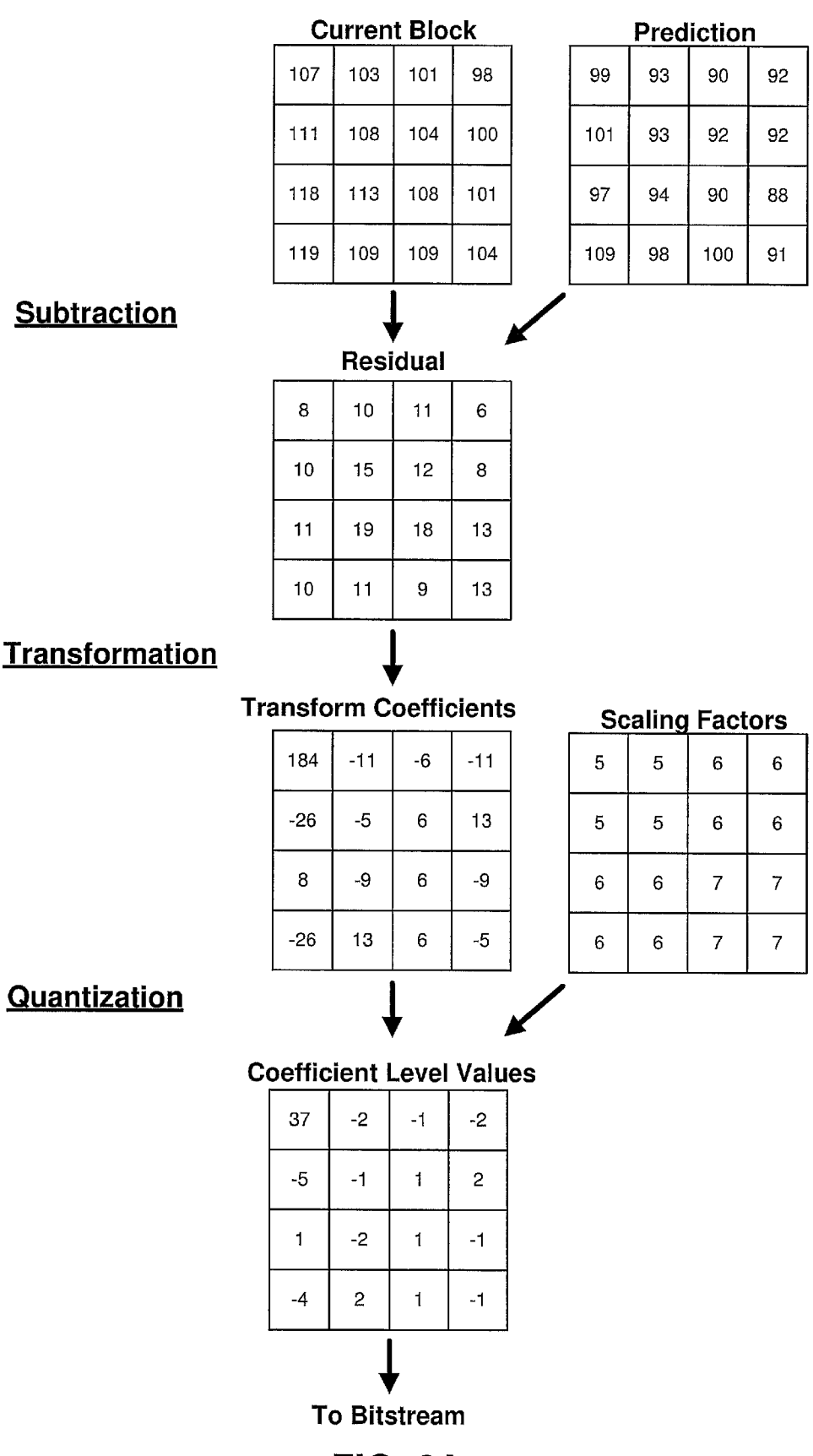
FIG. 6A is conceptual diagram illustrating example of coding a block of video data in accordance with one or more techniques of this disclosure.

FIGS. 6A-6B are conceptual diagrams illustrating examples of coding a block of video data. As illustrated in FIG. 6A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 6B, the current block of video data is decoded by performing inverse quantization on level values, performing an inverse transform, and adding a set of prediction values to the resulting residual. It should be noted that in the examples in FIGS. 6A-6B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 6A-6B, scaling is performed using an array of scaling factors.

In ITU-T H.265, an array of scaling factors is generated by selecting a scaling matrix and multiplying each entry in the scaling matrix by a quantization scaling factor. In ITU-T H.265, a scaling matrix is selected based on a prediction mode and a color component, where scaling matrices of the following sizes are defined: 4×4, 8×8, 16×16, and 32×32. Thus, it should be noted that ITU-T H.265 does not define scaling matrices for sizes other than 4×4, 8×8, 16×16, and 32×32. In ITU-T H.265, the value of a quantization scaling factor, may be determined by a quantization parameter, QP. In ITU-T H.265, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a quantization parameter may be derived for each of luma (Y) and chroma (Cb and Cr) components.

As illustrated in FIG. 6A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

Figure 15A:
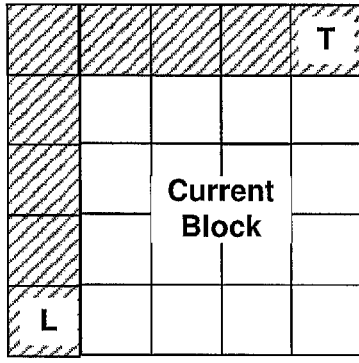
FIG. 15A is conceptual diagram illustrating example of performing intra prediction according to one or more techniques of this disclosure.

As described above, the planar prediction mode defined according to ITU-T H.265 can be described as a surface fitting. The planar prediction mode defined according to ITU-T H.265 includes averaging two linear predictions. That is, in ITU-T H.265, for each sample included in an CB a corresponding prediction is determined as an average of two linear predictions. A first horizontal linear prediction is generated by interpolating the value of a reconstructed sample value located in the adjacent above row to the CB at the right most position (illustrated as T in FIG. 15A) to the location of the current sample value with the reconstructed sample located in the adjacent left column to the CB and having the same vertical position as the current sample (i.e., defined as p[−1][y]). A second vertical linear prediction is generated by interpolating the value of a reconstructed sample value located in the adjacent left column to the CB at the bottom most position (illustrated as L in FIG. 15A) to the location of the current sample value with the reconstructed sample located in the adjacent above row to the CB and having the same horizontal position as the current sample (i.e., defined as p[x][−1]). Thus, referring to FIG. 15A the planar prediction mode defined according to ITU-T H.265 can be generally described as the average of (1) the interpolation of T with p[−1][y] and (2) the interpolation of L with p[x][−1]. The following equation provides the formal definition of the planar prediction mode as provided in ITU-T H.265.

$$predSamples\,[x\,][y\,] =$$

$$((nTbs - 1 - x) * p[-1][y] + (x + 1) * p\,[nTbs][-1] + (nTbs - 1 - y)*$$

$$p\,[x\,][-1\,] + (y\,+\,1\,) * p\,[-1\,][nTbs] + nTbs) >> (\mathrm{Log}2(nTbs) + 1)$$

where, nTbS specifies the size of the corresponding the transform block;

p[−1][y] is the sample value of a reconstructed sample located in the adjacent left column to the CB and having the same vertical position as the current sample;

p[nTbS][−1] is the sample value of T;

p[x][−1] is the sample value of a reconstructed sample located in the adjacent above row to the CB and having the same horizontal position as the current sample;

p[−1][nTbS] is the sample value of L;

x>>y is an arithmetic right shift of a two's complement integer representation of x by y binary digits; and Log 2(x) the base-2 logarithm of x.

Figure 15B:
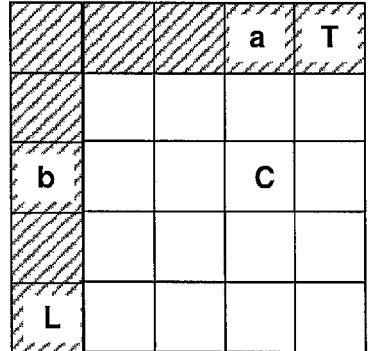
FIG. 15B is conceptual diagram illustrating example of performing intra prediction according to one or more techniques of this disclosure.

FIG. 15B illustrates an example where for a current sample, C, p[−1][y] is denoted as b and p[x][−1] is denoted as a.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated data may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

As described above, in JEM, a QTBT leaf node, which allows for arbitrary rectangular CBs, may be analogous to both a PB and a TB in ITU-T H.265. Thus, is some cases, JEM may provide less flexibility with respect to possible PB and TB structures than as provided in ITU-T H.265. As further described above, in ITU-T H.265, only square TBs are allowed and only square PBs are allowed for intra prediction. Thus, some processes in ITU-T H.265 are defined based on the assumption that an array of sample values input to the process must be square and as such, some processes in ITU-T H.265 may not provide adequate support for coding arbitrary rectangular video blocks. Further, QTBT partitioning and associated signaling as defined in JEM may be less than ideal. This disclosure describes techniques for performing video coding using arbitrary rectangular video blocks.

Figure 7:
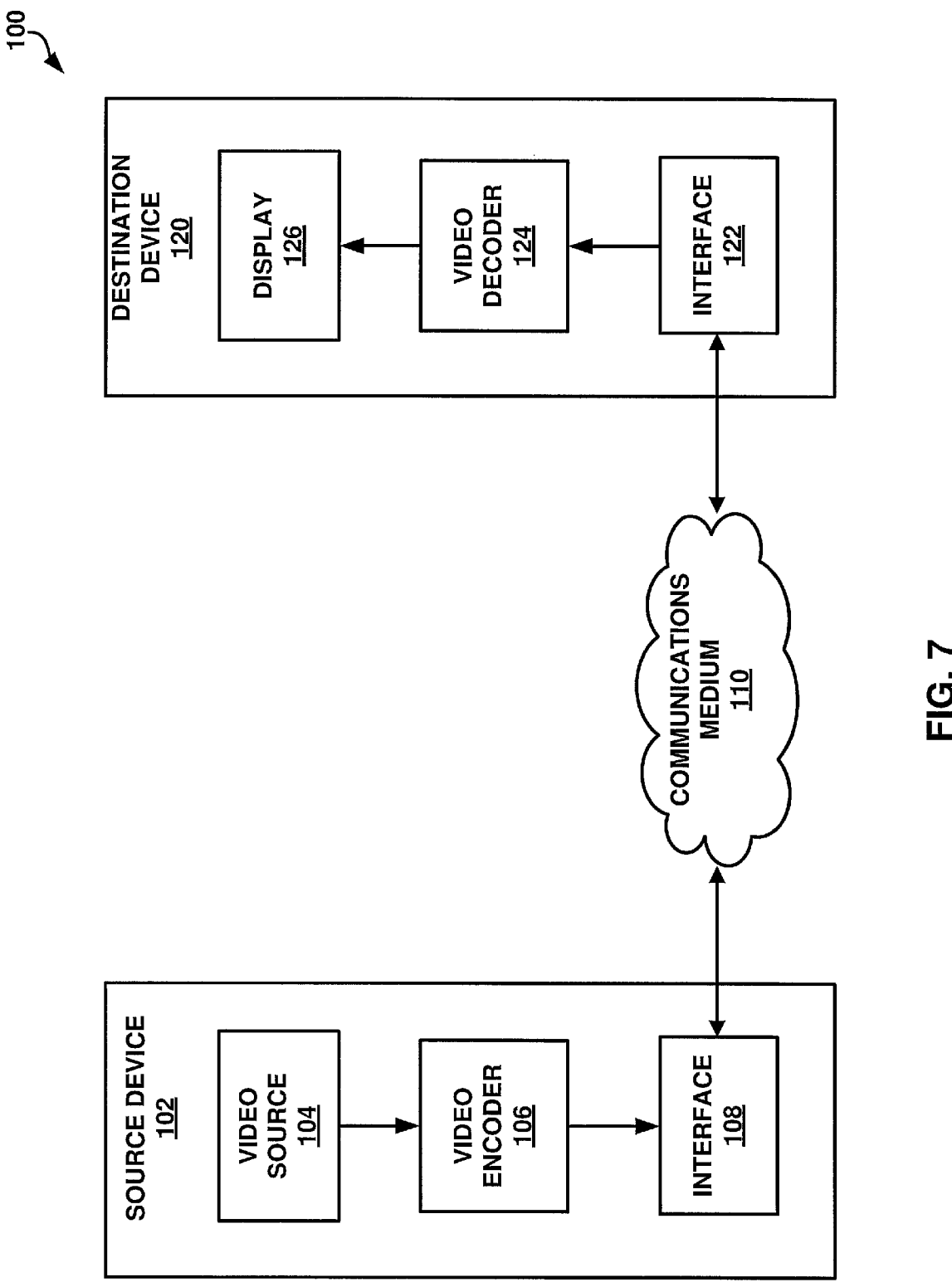
FIG. 7 is a block diagram illustrating an example of a system that may be configured to encode and decode video data according to one or more techniques of this disclosure.

FIG. 7 is a block diagram illustrating an example of a system that may be configured to code (i.e., encode and/or decode) video data according to one or more techniques of this disclosure. System 100 represents an example of a system that may perform video coding using arbitrary rectangular video blocks according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 1, source device 102 includes source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 1, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display an or Ultra High Definition display. It should be noted that although in the example illustrated in FIG. 7, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
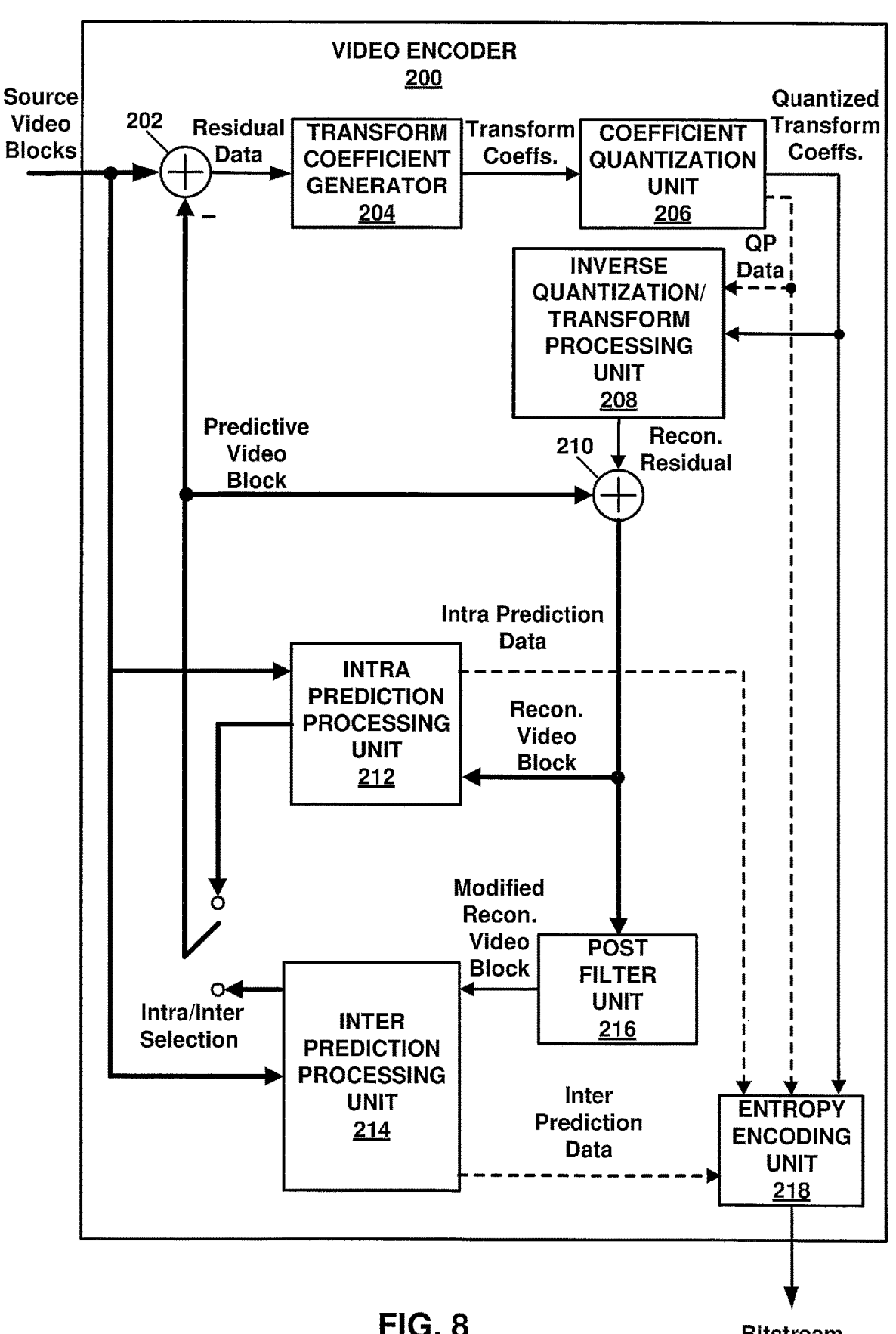
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that has been divided according to a coding structure. For example, source video data may include macroblocks, CTUs, CBS, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/transform processing unit 208, summer 210, intra prediction processing unit 212, inter prediction processing unit 214, post filter unit 216, and entropy encoding unit 218.

As illustrated in FIG. 8, video encoder 200 receives source video blocks and outputs a bitstream. As described above, JEM includes the following parameters for signaling of a QTBT tree: CTU size, MinQTSize, MaxBTSize, MaxBTDepth, and MinBTSize. Table 2 illustrates block sizes of QT leaf nodes at various QT depths for different CTU sizes (in the example, MinQTSize is 8). Further, Table 3 illustrates allowed block sizes of BT leaf nodes at various BT depths for binary tree root node sizes (i.e., leaf quadtree node sizes).

TABLE 2

| | | CTU size | | | | |
|---|---|---|---|---|---|---|
| | | 256 × 256 | 128 × 128 | 64 × 64 | 32 × 32 | 16 × 16 |
| QT Depth | 0 | 256 × 256 | 128 × 128 | 64 × 64 | 32 × 32 | 16 × 16 |
| | 1 | 128 × 128 | 64 × 64 | 32 × 32 | 16 × 16 | 8 × 8 |
| | 2 | 64 × 64 | 32 × 32 | 16 × 16 | 8 × 8 | |
| | 3 | 32 × 32 | 16 × 16 | 8 × 8 | | |
| | 4 | 16 × 16 | 8 × 8 | | | |
| | 5 | 8 × 8 | | | | |

TABLE 3

| | | Block Size of QT leaf CB | | | | |
|---|---|---|---|---|---|---|
| | | 128 × 128 | 64 × 64 | 32 × 32 | 16 × 16 | 8 × 8 |
| BT depth | 1 | 128 × 64 | 64 × 32 | 32 × 16 | 16 × 8 | 8 × 4 |
| | | 64 × 128 | 32 × 64 | 18 × 32 | 8 × 16 | 4 × 8 |
| | 2 | 64 × 64 | 32 × 32 | 16 × 16 | 8 × 8 | 4 × 4 |
| | | 128 × 32 | 64 × 16 | 32 × 8 | 16 × 4 | 8 × 2 |
| | | 32 × 128 | 16 × 64 | 8 × 32 | 4 × 16 | 2 × 8 |
| | 3 | 64 × 32 | 32 × 16 | 8 × 16 | 8 × 4 | |
| | | 32 × 64 | 16 × 32 | 16 × 8 | 4 × 8 | |
| | | 128 × 16 | 64 × 3 | 32 × 4 | 16 × 2 | |
| | | 16 × 128 | 8 × 32 | 4 × 32 | 2 × 16 | |

Thus, referring to Table 2, the quadtree node size, which forms the root of the binary tree, may be determined based on CTU size and a QT Depth. If the quadtree is further split into binary trees, then binary tree leaf node sizes may be determined based on QT node size and BT depth, as illustrated in Table 3. Each of MaxBTSize, MaxBTDepth, and MinBTSize may be used to determine a minimum allowed binary tree leaf node size. For example, if CTU size is 128×128, QT Depth is 3, MaxBTSize is 16×16, and MaxBTDepth is 2, the minimum allowed binary tree leaf node size includes 64 samples (i.e., 8×8, 16×4, or 4×16). In this case, if MaxBTDepth is 1, the minimum allowed binary tree leaf node size includes 128 samples (i.e., 16×8 or 8×16). Table 4 illustrates block sizes of BT leaf nodes at various combinations of QT depths and BT depths for a CTU size of 128×128.

TABLE 4

| | | QT Depth | | | | |
|---|---|---|---|---|---|---|
| | | 0 | 1 | 2 | 3 | 4 |
| BT Depth. | 0 | 128 × 128 | 64 × 64 | 32 × 32 | 16 × 16 | 8 × 8 |
| | 1 | 128 × 64 | 64 × 32 | 32 × 16 | 16 × 8 | 8 × 4 |
| | | 64 × 128 | 32 × 64 | 16 × 32 | 8 × 16 | 4 × 8 |
| | 2 | 64 × 64 | 32 × 32 | 16 × 16 | 8 × 8 | 4 × 4 |
| | | 128 × 32 | 64 × 16 | 32 × 8 | 16 × 4 | 8 × 2 |
| | | 32 × 128 | 16 × 64 | 8 × 32 | 4 × 16 | 2 × 8 |
| | 3 | 64 × 32 | 32 × 16 | 8 × 16 | 8 × 4 | |
| | | 32 × 64 | 16 × 32 | 16 × 8 | 4 × 8 | |
| | | 128 × 16 | 64 × 8 | 32 × 4 | 16 × 2 | |
| | | 16 × 128 | 8 × 32 | 4 × 32 | 2 × 16 | |

As described above, QTBT partitioning and associated signaling as defined in JEM may be less than ideal. For example, as described above with respect to FIG. 3, in JEM, when independent QTBTs are used for partitioning a CTU, CBs of the luma component are not required to and do not necessarily align with CBs of chroma components. That is, in JEM when independent QTBTs are used for partitioning a CTU, each of the luma component e chroma component partitions is signaled using separate sets of QT split flag and BT split mode syntax elements, such signaling may be less than ideal.

In some examples, according to the techniques described herein, video encoder 200 may be configured to partition CTUs such that luma and chroma components have a common partitioning structure up to a particular depth and thus share a common set of QT split flag and BT split mode syntax elements up to the particular depth. It should be noted that in this case, depth may correspond to an absolute depth of a QTBT, (i.e., a depth formed by the sum of QT depth and BT depth). It should be noted that in some cases, depth may correspond to a number of samples of a component (e.g., luma and/or chroma) in a block and optionally may be indicated according to a minimum width and/or minimum height. For example, a QTBT may be shared until an array of chroma samples is partitioned to a particular size. For example, a QTBT may be shared until one of the height or width of a node is less than a specified number of samples for a component, e.g., 8 samples. For example, a QTBT may be shared until number of samples of a component (e.g. luma and/or chroma) for a node is less than a specified number, e.g., 64. In one example, the depth may be predetermined for a set of CTUs. For example, the depth may be set at 2 for a slice of video data, or for example, set at 2 for a picture of video data. In one example, the depth may be signaled using a syntax element (e.g., shared_depth or the like). In one example, a shared depth syntax element may be signaled at the CTU-level. In one example, a shared depth syntax element may be signaled at the slice-level. In one example, a shared depth syntax element may be signaled at a parameter-set level (e.g., a Picture Parameter set (PPS) or a Sequence Parameter Set (SPS)). In one example, a higher level flag may be used to indicate the presence of a shared depth syntax element at a lower level. For example, a syntax element included at the slice level may indicate whether a shared depth syntax element is included for each CTU included in the slice. It should be noted that in a similar manner, a CTU level flag may be used to indicate that one or more of shared QTBTs, partially shared QTBTs, or independent QTBTs for luma and chroma components.

In one example, a shared depth syntax element may be a flag at a split-level. For example, for each QT split flag and/or BT split mode, a respective flag may indicate whether the split indicated is shared. In one example, a shared depth may be set using a shared depth syntax element at a high level and a lower level flag may be used to indicate sharing beyond the level specified by the syntax element. For example, a shared depth may be set at the slice level as a depth of 1 and each CTU within the slice may include a flag indicating whether for the particular CTU sharing is extended beyond a depth of 1 to a depth of 2.

Figure 9:
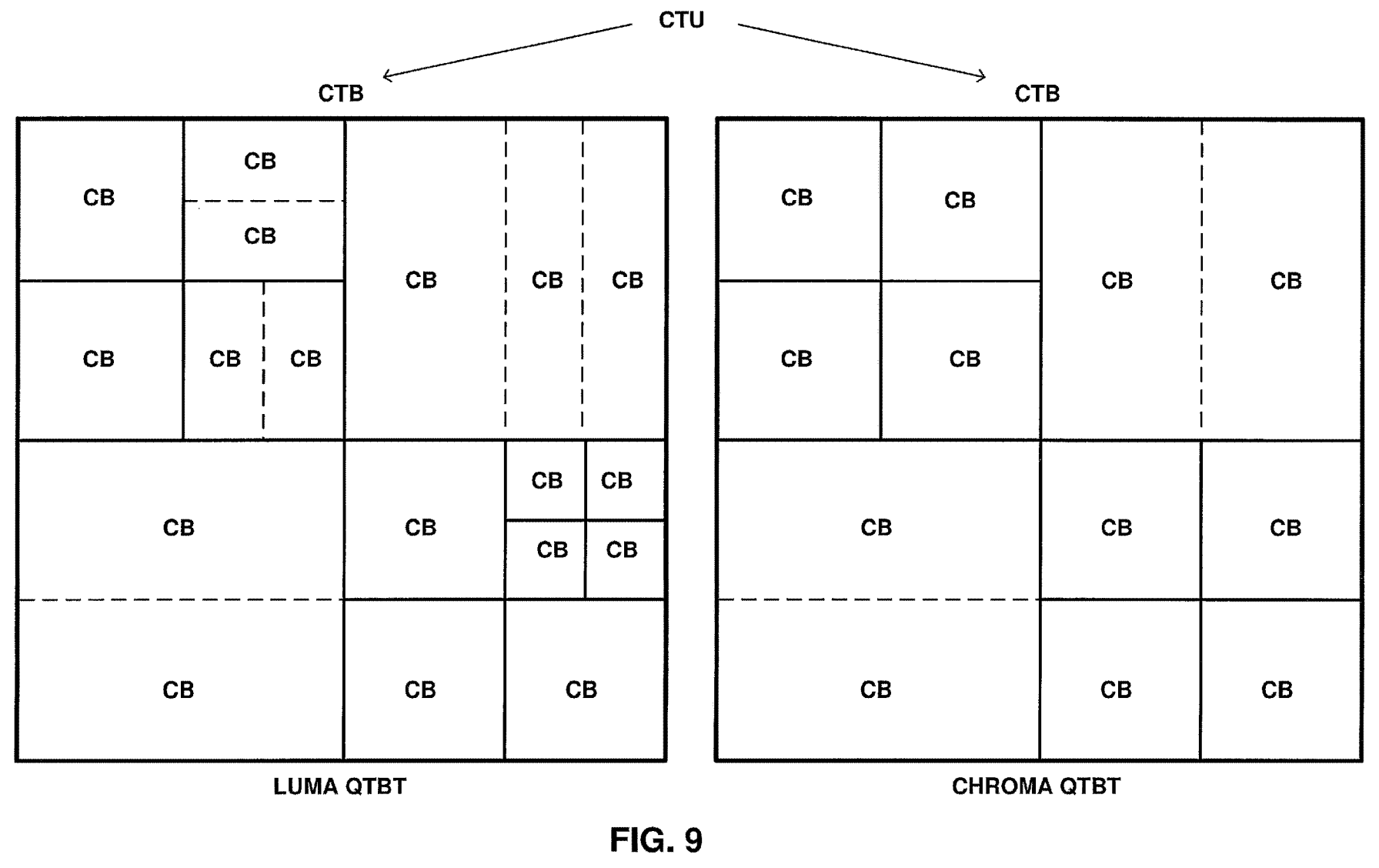
Figure 10:
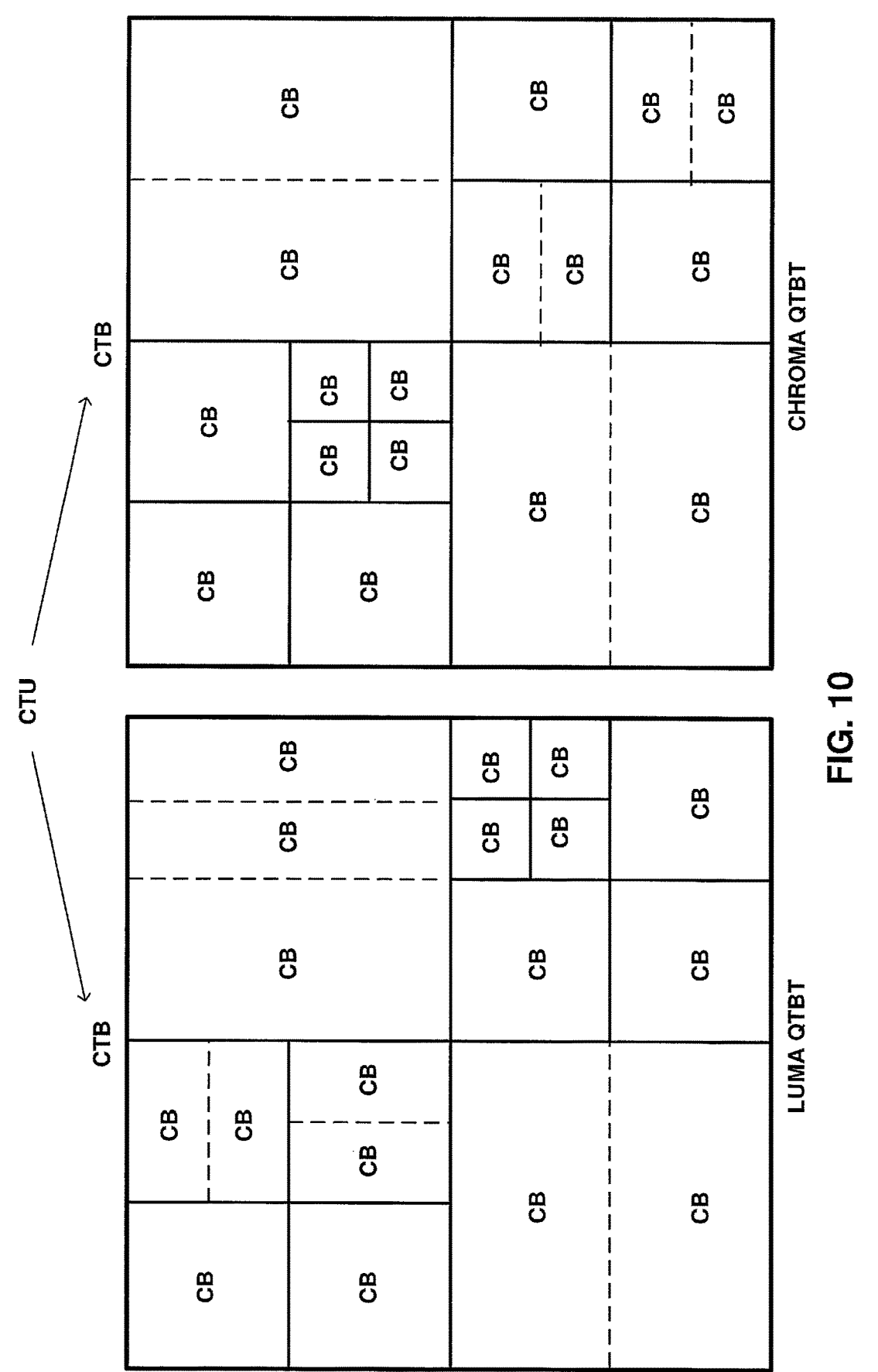
FIG. 10 is a conceptual diagram illustrating video component quad tree binary tree partitioning in accordance with one or more techniques of this disclosure.

FIG. 9 and FIG. 10 are conceptual diagrams illustrating an example where luma and chroma components have a common partitioning up to a shared depth. In the example illustrated in FIG. 9, the luma component is additionally partitioned beyond the shared depth of 1 and the chroma components are not partitioned beyond depth 1. In the example illustrated in FIG. 10, both the luma component and the chroma component are independently partitioned beyond the shared depth of 1. As described above, a video sampling format may define the number of chroma samples included in a CU with respect to the number of luma samples included in a CU. In one example, video encoder 200 may be configured to selectively partition the chroma components beyond a shared depth based on a sampling format. For example, in the case where a CTU is formatted according to a 4:2:0 sample format, in one example, video encoder 200 may be configured such that the chroma components may not be further partitioned beyond the shared depth. Further, in the case where a CTU is formatted according to a 4:4:4 sample format, in one example, video encoder 200 may be configured such that the chroma components may be further partitioned beyond the shared depth. Further, in addition, or as an alternative to a sampling format, one or more of: CTU size, MinQTSize, MaxBTSize, MaxBTDepth, and/or MinBTSize may be used to determine whether the chroma components are allowed to be partitioned beyond the shared depth.

Figure 11:
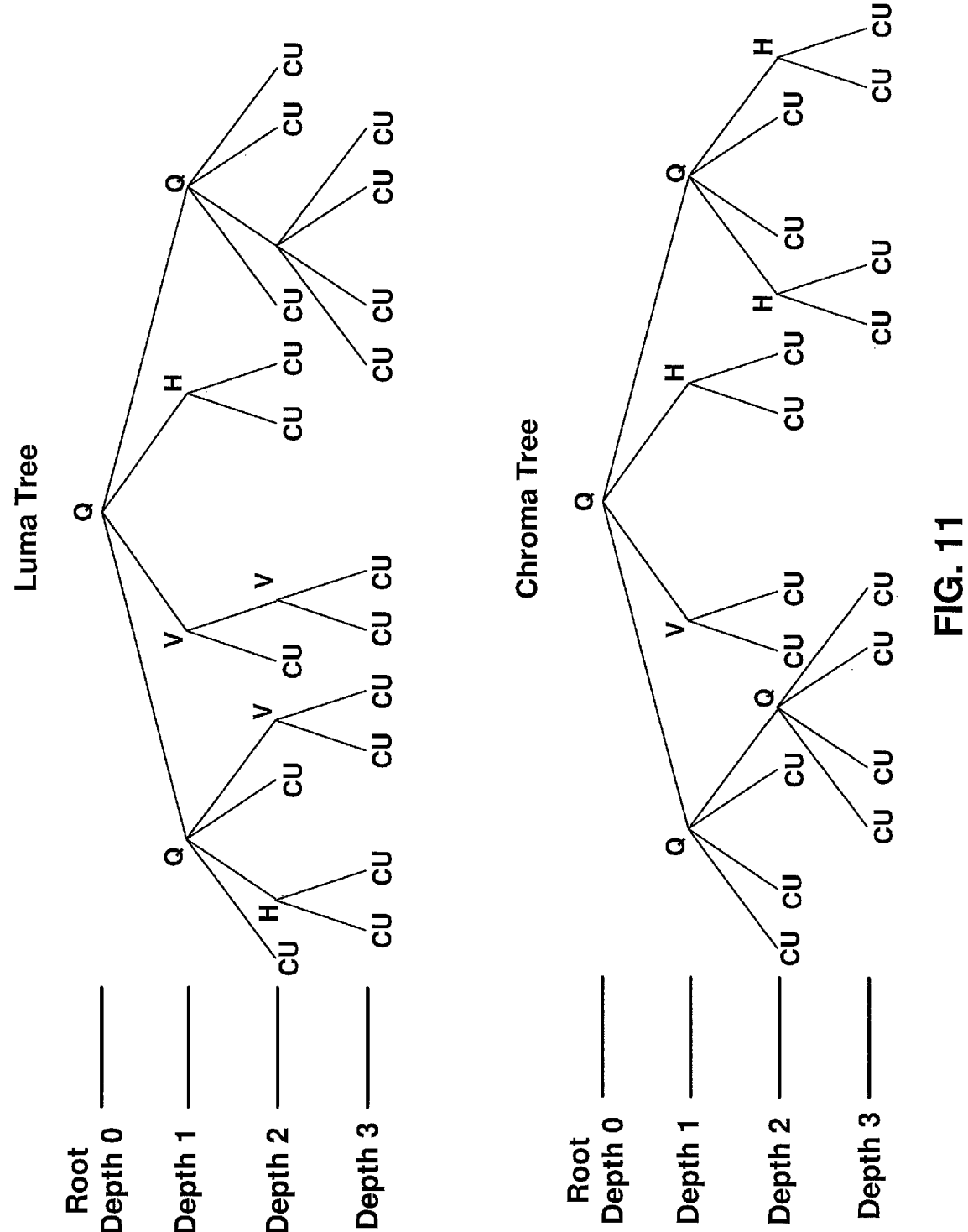
FIG. 11 is a conceptual diagram illustrating an example of a quad tree binary trees in accordance with one or more techniques of this disclosure.

FIG. 11 is a conceptual diagram illustrating an example of QTBTs corresponding to the example QTBT partitions illustrated in FIG. 10. As illustrated in FIG. 11, the QTBT for luma and QTBT for chroma are the same up to depth 1, i.e., the shared depth is 1. Further, it should be noted that the luma tree illustrated in FIG. 11, for purposes of explanation, is the same as the QTBT illustrated in FIG. 2. As such, for the example illustrated in FIG. 11, video encoder 200 may be configured to signal the luma QTBT based on the pseudo-syntax provided in Table 1. In one example, video encoder 200 may be configured to signal the chroma QTBT beyond the shared QTBT based on the pseudo-syntax provided in Table 5.

TABLE 5

```
//Depth 0 and Depth 1 for chroma derived from Table 1 syntax
      If additional partitioning condition ==TRUE:
            QT flag = 0, BT split = 0; //Depth 2 syntax chroma
            QT flag = 0, BT split = 0; //Depth 2 syntax chroma
            QT flag = 0, BT split = 0; //Depth 2 syntax chroma
            QT flag = 1; //Depth 2 syntax chroma
                  QT flag = 0, BT split = 0; //Depth 3 syntax chroma
                  QT flag = 0, BT split = 0; //Depth 3 syntax chroma
                  QT flag = 0, BT split = 0; //Depth 3 syntax chroma
                  QT flag = 0, BT split = 0; //Depth 3 syntax chroma
            QT flag = 0, BT split = 0; //Depth 2 syntax chroma
            QT flag = 0, BT split = 0; //Depth 2 syntax chroma
            QT flag = 0, BT split = 0; //Depth 2 syntax chroma
            QT flag = 0, BT split = 0; //Depth 2 syntax chroma
            QT flag = 0, BT split = 2. //Depth 2 syntax chroma
                  QT flag = 0, BT split = 0; //Depth 3 syntax chroma
                  QT flag = 0, BT split = 0; //Depth 3 syntax chroma
            QT flag = 0, BT split = 0; //Depth 2 syntax chroma
            QT flag = 0, BT split = 0. //Depth 2 syntax chroma
```

TABLE 5-continued

```
QT flag = 0, BT split = 2. //Depth 2 syntax chroma
        QT flag = 0, BT split = 0; //Depth 3 syntax chroma
        QT flag = 0, BT split = 0; //Depth 3 syntax chroma
```

In the example illustrated in Table 5, the addition partitioning condition may include a condition based on one or more of: sampling format, CTU size, MinQTSize, MaxBTSize, MaxBTDepth, and/or MinBTSize, as described above. It should be noted that in one example, video encoder 200 may be configured to signal the chroma QTBT beyond the shared QTBT by multiplexing the syntax elements illustrated in Table 1 and Table 5. For example, syntax elements for the chroma component nodes beyond the shared node and those which are descendants of the shared node may be signaled after syntax elements for the luma component nodes beyond the shared node and those which are descendants of the shared node. Table 6 illustrates an example of pseudo-syntax where syntax elements for the chroma components are signaled after syntax elements terminating the shared node into leaf nodes for the luma component. In one example, chroma syntax elements may be signaled before the luma syntax elements.

TABLE 6

```
QT flag = 1; //Depth 0 syntax
    QT flag = 1; //Depth 1 syntax
        QT flag = 0, BT split = 0; //Depth 2 syntax luma
        QT flag = 0, BT split = 2; //Depth 2 syntax luma
            BT split = 0; //Depth 3 syntax luma
            BT split = 0; //Depth 3 syntax luma
        QT flag = 0, BT split = 0; //Depth 2 syntax luma
        QT flag = 0, BT split = 1; //Depth 2 syntax luma
            BT split = 0; //Depth 3 syntax luma
            BT split = 0; //Depth 3 syntax luma
        QT flag = 0, BT split = 0; //Depth 2 syntax chroma
        QT flag = 0, BT split = 0; //Depth 2 syntax chroma
        QT flag = 0, BT split = 0; //Depth 2 syntax chroma
        QT flag = 1; //Depth 2 syntax chroma
            QT flag = 0, BT split = 0; //Depth 3 syntax chroma
            QT flag = 0, BT split = 0; //Depth 3 syntax chroma
            QT flag = 0, BT split = 0; //Depth 3 syntax chroma
            QT flag = 0, BT split = 0; //Depth 3 syntax chroma
    ...
```

In this manner, video encoder 200 represents an example of a device configured to receive a video block including sample values for a first component of video data and second component of video data, partition the sample values for the first component of video data according to a first quad tree binary tree partitioning structure, and partition the sample values for the second component of video data according to the first quad tree binary tree partitioning structure up to a shared depth.

As described above, ITU-T H.265, supports four asymmetric PB partitions for inter prediction. It should be noted that the asymmetric PB partitions provided in ITU-T H.265 may be less than ideal. That is, the asymmetric PB partitions provided in ITU-T H.265 are limited to enabling PBs having one quarter of the width or height of a square CB. For example, for a 32×32 CB in ITU-T H.265, a M/4×M left partition partitions the CBs into a 8×32 PB and a 24×32 PB. ITU-T H.265 does not provide a mechanism to partition a CB into PBs based on an arbitrary offset. That is, PBs are not allowed to have an arbitrary width or height. In some cases, it may be useful to partition a CTB according to arbitrary offsets. For example, in the example above, for a 32×32 CB in some cases, based on the properties of an image, it may be useful to partition the CB into a 10×32 PB and a 22×32 PB. Further, referring to Table 3 above, in some cases it may be useful to further partition a binary leaf node according to an arbitrary offset. That is, in JEM potential leaf node sizes are limited to those illustrated in Table 3. For example, in the case where a binary leaf node is 32×128, it may be useful to further partition the binary leaf node into a 32×28 CB and a 32×100 CB. It should be noted that partitioning a block of video data according to an arbitrary offset according to the techniques described herein may be applied in, at least, one or more of the following cases: (1) arbitrary offset partitioning may be applied to the partitioning of a CTU (or CTB) into CUs (or CB) in the case where a CU (or CB) forms the root of a PU (or PB); (2) arbitrary offset partitioning may be applied to the partitioning of a CTU (or CTB) into CUS (or CBs) in the case where a CU (or CB) does not form the root of a PU (or PB), i.e., in the case where a prediction is determined at the CB level; (3) arbitrary offset partitioning may be applied to the partitioning of a PU (or PB); and (4) arbitrary offset partitioning may be applied to partitioning blocks of samples which correspond to nodes of a coding tree. It should be noted that in some cases arbitrary offset partitioning may be selectively enabled for CTU partitioning and/or PU partitioning.

Figure 12:
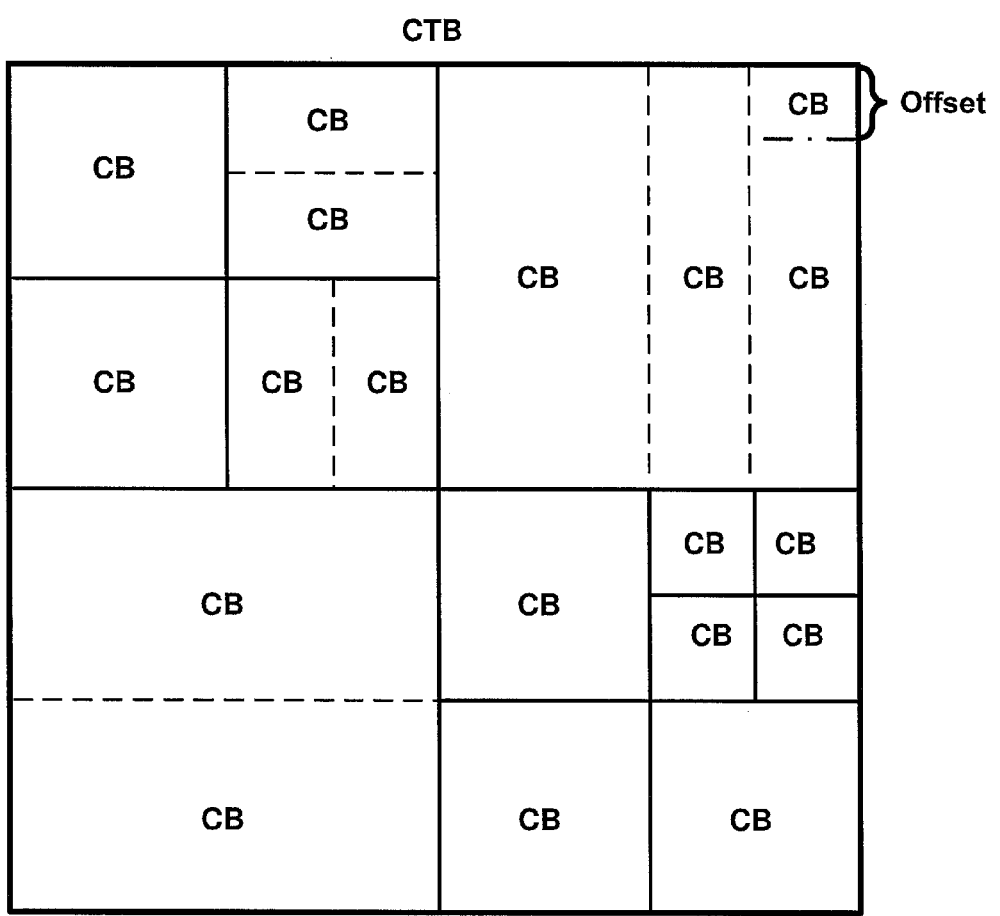
FIG. 12 is a conceptual diagram illustrating quad tree binary tree partitioning in accordance with one or more techniques of this disclosure.

FIG. 12 illustrates an example where a binary leaf node is further partitioned horizontally according an offset. It should be noted that although the example illustrated in FIG. 12 includes partitioning a binary leaf node according to arbitrary offset partitioning, such an example should not be construed as limiting and as described herein, arbitrary offset partitioning, may be applicable to various scenarios where video data is partitioned. In the example illustrated in FIG. 12, the CTB may correspond to a luma CTB having a size of 256×256. In such a case, the binary leaf node at the upper right corner would have a size of 32×128. As described above, it may be useful to further partition a 32×128 binary leaf node into a 32×28 CB and a 32×100 CB. In the example partitioning illustrated in FIG. 12, offset would have a value of 28. In one example, video encoder 200 may be configured to partition leaf nodes of a QTBT according to an offset. In one example, video encoder 200 may be configured such that any number of asymmetric offset partition structures may be allowed. That is, in some examples, the offset may be within the range of 2 to block height minus 2 for vertical offsets and within the range of 2 to block width minus 2 for horizontal offsets. In some examples, the offset may be within the range of 1 to block height minus 1 for vertical offsets and within the range of 1 to block width minus 1 for horizontal offsets. In some examples, the allowed asymmetric offset partitions may be restricted based on properties associated with a CTU and/or prediction modes. For example, asymmetric offset partitions may be restricted based on whether the CU is coded according to a intra prediction or an inter prediction. Further, in some examples, asymmetric offset partitions may be restricted based on the size of a CU or CB. In one example, the value of an offset may be restricted to a set integer multiples. In one example, the value of an offset may be restricted to a set integer multiples and some additional integer values (e.g., 2). In some examples, the set of integer multiples may be based on the size of the leaf node at which an offset is being applied. For example, with respect to the case of horizontally partitioning a 32×128 leaf node as described above. In one example, the value of offset may be restricted to a multiple of 4 (i.e., allowed values of offset include 4, 8, 12, 16, . . . , 120, 124). In one example, the value of offset may be specified using an indexed set of offset values. For example, with respect to the case of horizontally partitioning a 32×128 leaf node as described above, in one example, the value of offset may be restricted to the following set of offset values 28, 42, 84, and 100. In some examples, an indexed set of offset values may be selected in order to avoid partitions that may be signaled using QTBT signaling or close variations thereof. For example, in the case of horizontally partitioning a 32×128 leaf node, in some cases (e. g., depending on the value of MaxBTDepth), the BT structure may allow the 32×128 leaf node to be split into two 32×64 partitions. In this case, an indexed set of offset values may be selected such that offset is not within a specified range of 64. Further in some examples, the indexed set of offset values may be based on the value of MaxBTDepth.

It should be noted that allowed asymmetric offset partitions, in some examples, may include horizontal or vertical partitioning. For example, in one example, with respect to a 32×128 binary leaf, video encoder 200 may be configured to further partition the 32×128 binary leaf node into a 8×128 CB and a 24×128 CB. In this manner, an offset may indicate an offset value relative to an anchor point. For example, an anchor point may include a left edge for vertical partitioning and a top edge for horizontal partitioning. It should be noted that in some examples, the anchor may be a set number of samples from an edge. For example, the anchor may be set at 4 samples from an edge. In this manner, an offset value of zero would indicate a partition 4 samples from the edge. In one example, offset may include fixed length binarization. In one example, offset may include a truncated unary binarization.

As described above, in one example, the value of offset may be specified using an indexed set of offset values. In one example, an indexed set of offset values may correspond to fractional partitions. Table 7 and Table 8 provide examples of indexed sets of offset values corresponding to fractional partitions. With respect to Table 7 and Table 8, it should be noted that fractional partitions, in some examples, may be rounded to the nearest sample value. For example, with respect to the case of horizontally partitioning a 32×128 leaf node as described above, in one example a ⅓ offset from the edge value may be rounded to 43. With respect to Table 7 and Table 8, it should be noted that in an example, fractional partitions may be rounded to the nearest integer-multiple sample value. For example, with respect to the case of horizontally partitioning a 32×128 leaf node as described above, in one example a ⅓ offset from the edge value may be rounded to 44, which is the nearest 4 sample multiple. With respect to Table 7 and Table 8, it should be noted that, in an example, fractional partitions may be rounded down to the nearest integer-multiple sample value. For example, with respect to the case of horizontally partitioning a 32×128 leaf node as described above, in one example a ⅓ offset from the edge value may be rounded to 40 which is the nearest 4 sample multiple.

TABLE 7

| Offset from Edge | Binary representation of Offset |
|---|---|
| 1/4 of block dimension under consideration | 01 |
| 1/2 of block dimension under consideration | 1 |
| 1/4 of block dimension under consideration | 00 |

TABLE 8

| Offset from Edge | Binary representation of Offset |
|---|---|
| 1/3 of block dimension under consideration | 01 |
| 1/2 of block dimension under consideration | 1 |
| 2/3 of block dimension under consideration | 00 |

As described above, video encoder 200 may be configured to signal a QTBT. In one example, video encoder 200 may be configured to indicate offset values by incorporating offset signaling within the signaling of a QTBT. For example, the example illustrated in FIG. 12 includes the same QTBT structure as the example illustrated in FIG. 1. As such, offset signaling may be based on the example pseudo-syntax illustrated in Table 1, where, in one example, offset signaling is included after syntax indicating a leaf node. Table 9 illustrates an example pseudo-syntax corresponding to the case where for a 256×256 CTB the binary leaf node at the upper right corner having a size of 32×128 is further partitioned a 32×28 CB and a 32×100 CB.

TABLE 9

```
...
    QT flag = 0; BT split = 1; //Depth 1 syntax
        BT split = 0; //Depth 2 syntax
            Offset = FALSE //Offset Flag
        BT split = 1; //Depth 2 syntax
            BT split = 0; //Depth 3 syntax
                Offset = FALSE //Offset Flag
            BT split = 0; //Depth 3 syntax
                Offset = TRUE; //Offset Flag
                Offset_type = Horizontal; //Offset Type
    Flag
                Offset value = 28; //Offset value
    QT flag = 0; BT split = 2; //Depth 1 syntax
...
```

Thus, according to the example illustrated in Table 9, video encoder 200 may be configured to signal a flag indicating offset partitioning is applied to a QTBT leaf node, signal a flag indicating whether the offset partitioning is a vertical or a horizontal partitioning, and signal a value indicating an offset value. It should be noted that in other examples, video encoder 200 may be configured to indicate offset values using other signaling techniques. For example, video encoder 200 may be configured to signal offset values at the CB level. It should be noted that in some examples, offsets may be signaled as an extension of current BT split mode signaling. That is, for example, in JEM, a BT split mode syntax elements results in halving a node. In one example, according to the techniques descried herein, BT split mode signaling may include signaling a split type and offset pair. For example, referring to the example illustrated FIG. 12, in one example the offset may be signaled as follows: (BT split=2, Offset value=28).

Figure 13:
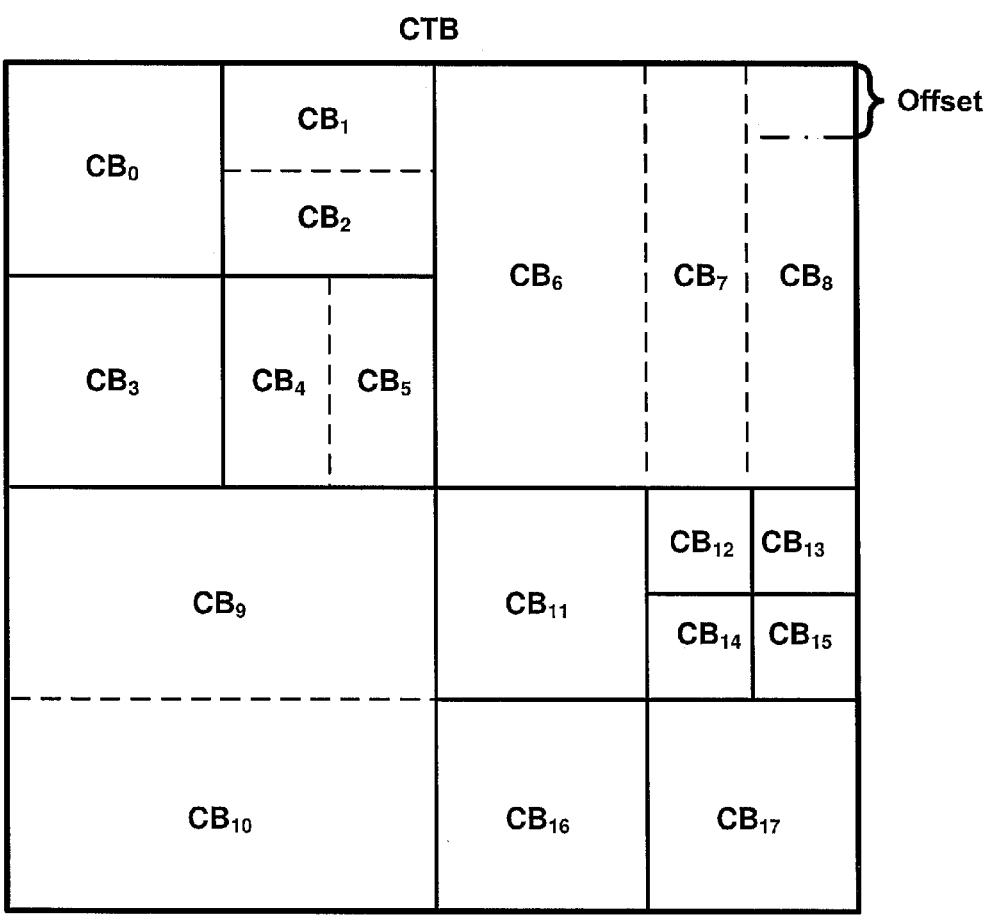
FIG. 13 is a conceptual diagram illustrating quad tree binary tree partitioning in accordance with one or more techniques of this disclosure.

Further, in one example, each CB of a CTB may be indexed according to a defined scan order and video encoder 200 may be configured to signal offset values by signaling an index value for a CB. For example, referring to FIG. 13, the binary leaf node at the upper right corner is illustrated as being indexed as CB8. Thus, in one example, video encoder 200 may be configured to use this index value to indicate that offset partitioning is performed for this leaf node. In this manner, video encoder 200 represents an example of a device configured to determine an offset value and partition the leaf node according to the offset value.

In one example, a set of split decisions (arbitrary offset partition(s) and/or QT partitions(s)) in a pre-determined order may be applied to a block of samples and indicated in the bitstream using a single indicator.

Referring again to FIG. 8, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 8, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode.

As described above, ITU-T H.265 provides a formal definition of a planar prediction mode, which is based on a variable nTbS which specifies the size of the corresponding the transform block. As further described above, in ITU-T H.265, TBs are restricted to the following sizes 4×4, 8×8, 16×16, and 32×32. Thus, nTbS may have a value of 4, 8, 16, or 32 to indicate the size of a square and as such does not enable arbitrary sized rectangles to be indicated. Thus, the planar prediction mode defined according to ITU-T H.265 may be less than ideal for performing a planar prediction with respect to arbitrary sized rectangles. According to the techniques described herein, video encoder 200 may be configured to perform a planar prediction with respect to an arbitrary sized rectangular CB.

In one example, video encoder 200 may be configured to perform a planar prediction with respect to an arbitrary sized rectangular CB by averaging a horizontal interpolation and a vertical prediction. Such a planar prediction may be described generally as follows:

$$predSamples\,[x\,][y\,] =$$
$$(Hor\_Interpolation\,[x][y] + Ver\_Interpolation\,[x][y] + 1)/2$$

In one example, the Hor_Interpolation [x][y] and the Ver_Interpolation [x][y] may be respectively based on the width and the height of a CB according to the following equations:

$$Hor\_Interpolation\,[x][y] =$$
$$((nCbSW - 1 - x) * p\,[-1][y] + (x + 1) * p\,[nCbSW][-1])/nCbSW$$
$$and$$
$$Ver\_Interpolation\,[x][y] =$$
$$((nCbSH - 1 - y) * p\,[x][-1] + (y + 1) * p\,[-1][nCbSH])/nCbSH$$

Which may be expressed as:

$$predSamples\,[x][y] =$$

$$(((nCbSW - 1 - x) * p\,[-1][y] + (x + 1) * p\,[nCbSW][-1]) * nCbSH +$$

$$((nCbSH - 1 - y) * p\,[x][-1] + (y + 1) * p\,[-1][nCbSH] * nCbSW +$$

$$nCbSW * nCbSH)/(2 * nCbSW * nCbSH)$$

where, nCbSW specifies the width of the corresponding the coding block;

nCbSH specifies the height of the corresponding the coding block;

p[−1][y] is the sample value of a reconstructed sample located in the adjacent left column to the CB and having the same vertical position as the current sample;

p[nCbSW][−1] is the sample value of T;

p[x][−1] is the sample value of a reconstructed sample located in the adjacent above row to the CB and having the same horizontal position as the current sample;

p[−1][CTbSH] is the sample value of L; and

/ is an integer division operation with the result truncated to zero.

With respect to the example equations above, it should be noted that although the equations are described with respect to a CB, in other examples the equations may be described based on a PB, a TB, and/or other coding structures or picture areas.

Figure 16A:
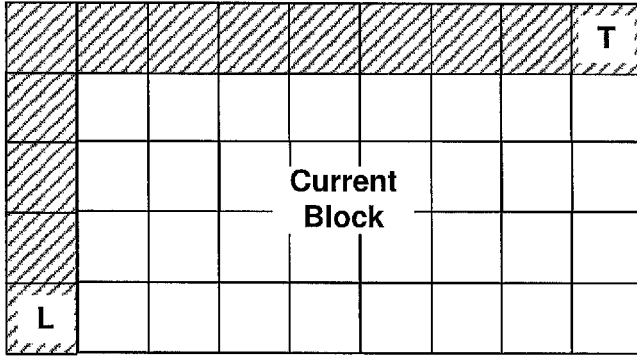
FIG. 16A is conceptual diagram illustrating example of performing intra prediction according to one or more techniques of this disclosure.
Figure 16B:
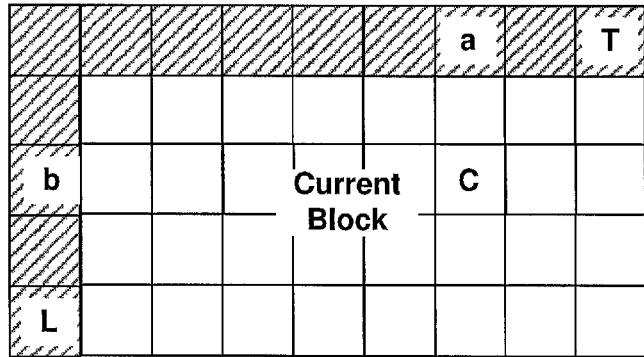
FIG. 16B is conceptual diagram illustrating example of performing intra prediction according to one or more techniques of this disclosure.

With respect to the example equation above, it should be noted that in some cases, a coding block may correspond to a transform block and in other cases the coding block and transform block structures may be independent. FIG. 16A illustrates the locations of T and L with respect to an example rectangular CB according to the equation above. FIG. 16B illustrates an example where for a current sample, C, p[−1][y] is denoted as b and p[x][−1] is denoted as a. It should be noted that according to the equation above, in cases where nCbSW is greater than nCbSH, a relatively higher weight is applied to a compared to b and in cases where nCbSH is greater than nCbSW, a relatively higher weight is applied to a compared to b. Thus, video encoder 200 may be configured to perform planar predictions in a manner that considers the orientation of a rectangular array of sample values. It should be noted that in some examples a weighted average may be applied to the horizontal interpolation and the vertical interpolation. For example, such a planar prediction may be described generally as follows:

$$predSamples\,[x][y] = (\alpha * Hor\_Interpolation\,[x][y] +$$

$$\beta * Ver\_Interpolation\,[x][y] + (\alpha + \beta)/2)/(\alpha + \beta)$$

where α and β are dependent on nCbSH and/or nCbSW. Further, α and β are dependent may be dependent on PB, TB, and/or other coding structures or picture areas in other examples.

Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 8, inter prediction processing unit 214 may receive reconstructed video block via post filter unit 216. Post filter unit 216 may be configured to perform deblocking and/or Sample Adaptive Offset (SAO) filtering. Deblocking refers to the process of smoothing the boundaries of reconstructed video blocks (e.g., make boundaries less to a perceptible viewer). SAO filtering is a non-linear amplitude mapping that may be used to improve reconstruction by adding an offset to reconstructed video data.

Referring again to FIG. 8, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 14:
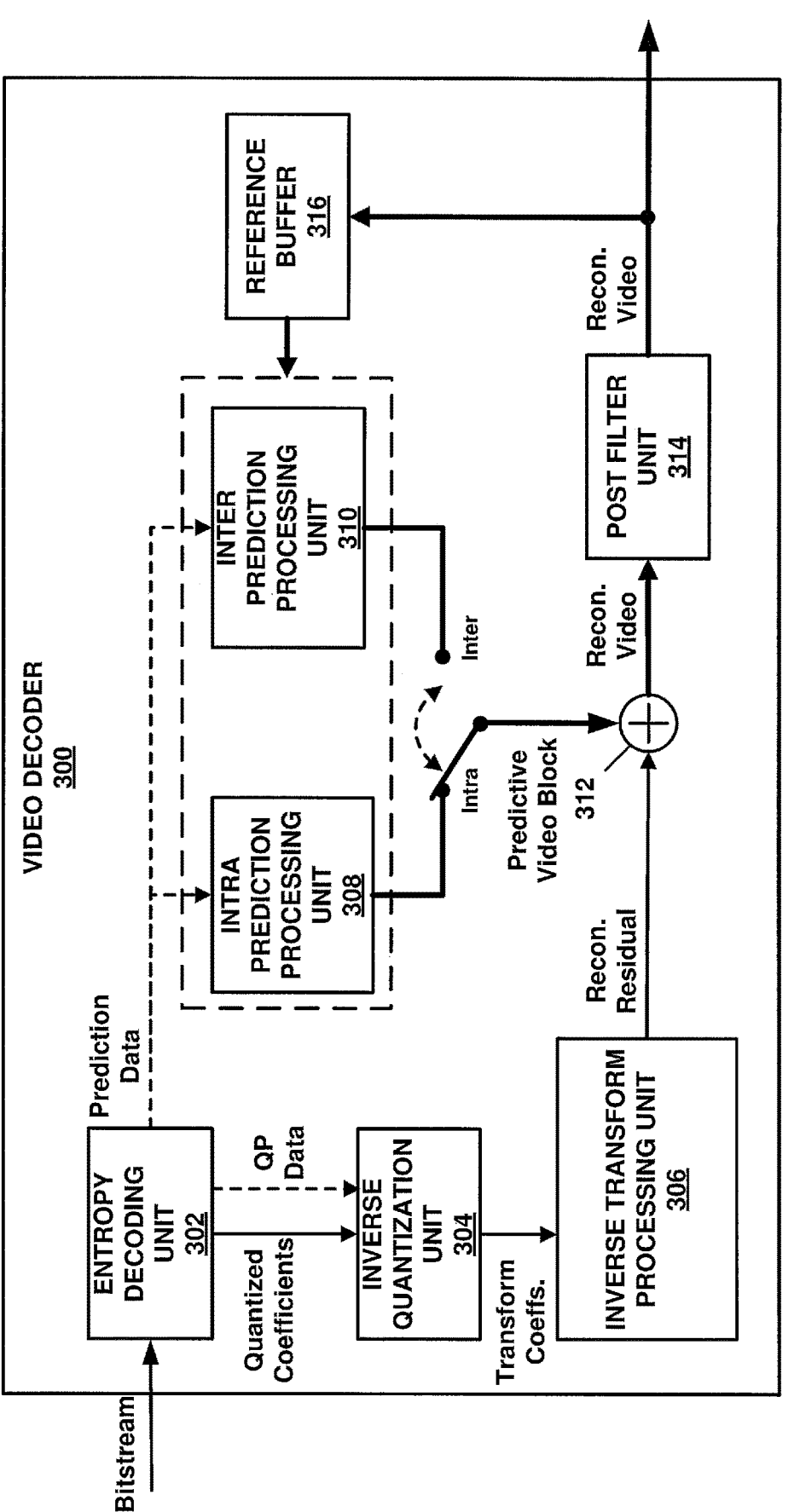
FIG. 14 is a block diagram illustrating an example of a video decoder that may be configured to decode video data according to one or more techniques of this disclosure.

FIG. 14 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 14 video decoder 300 includes an entropy decoding unit 302, inverse quantization unit 304, inverse transformation processing unit 306, intra prediction processing unit 308, inter prediction processing unit 310, summer 312, post filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder may be realized using any combination of hardware, firmware, and/or software implementations.

As illustrated in FIG. 14, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. That is, for example, video decoder 300 may be configured to determine QTBT partitioning structures generated and/or signaled based on one or more of the techniques described above for purposes of reconstructing video data. For example, video decoder 300 may be configured to parse syntax elements and/or evaluate properties of video data in order to determine a shared depth of a QTBT. Further, video decoder 300 may be configured to determine an offset value and partition a block of video data according to the offset value.

Referring again to FIG. 14, inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. For example, inverse quantization unit 304 may be configured to infer predetermined values (e.g., determine a sum of QT depth and BT depth based on coding parameters), allowed quantization group sizes, and the like, according to the techniques described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 14, reconstructed residual data may be provided to summer 312. Summer 312 may add reconstructed residual data to a predictive video block and generate reconstructed video data. A predictive video block may be determined according to a predictive video technique (i.e., intra prediction and inter frame prediction). In one example, video decoder 300 and the post filter unit 314 may be configured to determine QP values and use them for post filtering (e. g., deblocking). In one example, other functional blocks of the video decoder 300 which make use of QP may determine QP based on received signaling and use that for decoding.

Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Post filter unit 314 may be configured to perform filtering on reconstructed video data. For example, post filter unit 314 may be configured to perform deblocking and/or SAO filtering, as described above with respect to post filter unit 216. Further, it should be noted that in some examples, post filter unit 314 may be configured to perform proprietary discretionary filter (e. g., visual enhancements). As illustrated in FIG. 14, a reconstructed video block may be output by video decoder 300. In this manner, video decoder 300 may be configured to generate reconstructed video data according to one or more of the techniques described herein. In this manner video decoder 300 may be configured to parse a first quad tree binary tree partitioning structure, apply the first quad tree binary tree partitioning structure to a first component of video data, determine a shared depth, and applying the first quad tree binary tree partitioning structure to a second component of video data up to the shared depth. In this manner, video decoder 300 represents an example of a device configured to determine an offset value and partition the leaf node according to the offset value.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e. g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method of generating a predicted sample value corresponding to a current sample having a position, (x, y), in a rectangular video block according to a planar prediction, the method comprising:

calculating a vertical interpolation value being equal to a product of a width, W, of the rectangular video block and a sum of a first value, $(H-1-y)*p[x][-1]$, and a second value, $(y+1)*p[-1][H]$;

calculating a horizontal interpolation value being equal to a product of a height, H, of the rectangular video block and a sum of a third value, $(W-1-x)*p[-1][y]$, and a fourth value, $(x+1)*p[W][-1]$; and where, p[x][-1] is a sample value of a reconstructed sample located in an adjacent above row to the rectangular video block and having a same horizontal position as the current sample, p[-1][H] is a sample value of a reconstructed sample located at adjacent to a bottom left of the rectangular video block, p[-1][y] is a sample value of a reconstructed sample located in an adjacent left column to the rectangular video block and having a same vertical position as the current sample, p[W][-1] is a sample value of a reconstructed sample located at adjacent to an upper right of the rectangular video block and generating the predicted sample value being equal to a quotient of (a) a sum of the vertical interpolation value, the horizontal interpolation value, and the product of the width of the rectangular video block and the height of the rectangular video block, W*H, and (b) a product of twice the width of the rectangular video block and the height of the rectangular video block, 2*W*H.

2. The method of claim 1, wherein the width of the rectangular video block and the height of the rectangular video block are not equal.

3. The method of claim 2, wherein the rectangular video block is a transform block.

4. A device for coding video data by generating a predicted sample value corresponding to a current sample having a position, (x, y), in a rectangular video block according to a planar prediction, the device comprising one or more processors configured to:

calculate a vertical interpolation value being equal to a product of a width, W, of the rectangular video block and a sum of a first value, $(H-1-y)*p[x][-1]$, and a second value, $(y+1)*p[-1][H]$;

calculate a horizontal interpolation value being equal to a product of a height, H, of the rectangular video block and a sum of a third value, $(W-1-x)*p[-1][y]$, and a fourth value, $(x+1)*p[W][-1]$; and where, p[x][-1] is a sample value of a reconstructed sample located in an adjacent above row to the rectangular video block and having a same horizontal position as the current sample, p[-1][H] is a sample value of a reconstructed sample located at adjacent to a bottom left of the rectangular video block, p[−1][y] is a sample value of a reconstructed sample located in an adjacent left column to the rectangular video block and having a same vertical position as the current sample, p[W][−1] is a sample value of a reconstructed sample located at adjacent to an upper right of the rectangular video block and generate the predicted sample value being equal to a quotient of (a) a sum of the vertical interpolation value, the horizontal interpolation value, and the product of the width of the rectangular video block and the height of the rectangular video block, W*H, and (b) a product of twice the width of the rectangular video block and the height of the rectangular video block, 2*W*H.

5. The device of claim 4, wherein the rectangular video block is a transform block and wherein the width of the transform block and the height of the transform block are not equal.

6. An apparatus for coding video data, the apparatus comprising means for performing any and all combinations of the step of claim 1.

\*    \*    \*    \*    \*